(12) United States Patent
Cattani et al.

(10) Patent No.: US 11,479,171 B2
(45) Date of Patent: Oct. 25, 2022

(54) SYSTEM FOR MONITORING AN ACOUSTIC SCENE OUTSIDE A VEHICLE

(71) Applicant: ASK INDUSTRIES SOCIETA' PER AZIONI, Monte San Vito (IT)

(72) Inventors: Luca Cattani, Scandiano (IT); Tiziano Nili, Reggio Emilia (IT); Stefano Squartini, Ancona (IT); Leonardo Gabrielli, Osimo (IT); Livio Ambrosini, Chiaravalle (IT)

(*) Notice: Subject to any disclaimer, the term of this patent is extended or adjusted under 35 U.S.C. 154(b) by 356 days.

(21) Appl. No.: 16/816,657

(22) Filed: Mar. 12, 2020

(65) Prior Publication Data
US 2020/0298756 A1   Sep. 24, 2020

(30) Foreign Application Priority Data

Mar. 18, 2019   (IT) .......................... 102019000003875

(51) Int. Cl.
*B60Q 9/00* (2006.01)
*G01S 3/801* (2006.01)
*H04R 3/00* (2006.01)

(52) U.S. Cl.
CPC .............. *B60Q 9/00* (2013.01); *G01S 3/801* (2013.01); *H04R 3/005* (2013.01); *B60T 2210/122* (2013.01)

(58) Field of Classification Search
CPC .......... B60Q 9/00; G01S 3/801; H04R 3/005; B60T 2210/122; B60W 2050/0057; B60W 2420/54; B60W 40/068; G01B 17/08; G01N 29/223; G01N 29/46; G01N 2291/0232; G01N 29/4481; G01N 29/14;
(Continued)

(56) References Cited

U.S. PATENT DOCUMENTS 5,586,028 A    12/1996  Sekine et al.
2011/0109448 A1   5/2011  Browne et al.
(Continued)

FOREIGN PATENT DOCUMENTS

CN       103573098 A     2/2014
DE        10234611 A1    2/2004
DE    102017200385 A1    7/2018
(Continued)

OTHER PUBLICATIONS

Search Report Form IT237 "Written Opinion"; dated Oct. 17, 2019 with reference to the priority Italian Patent Application No. 102019000003875.

*Primary Examiner* — Kabir A Timory
(74) *Attorney, Agent, or Firm* — Egbert, McDaniel & Swartz, PLLC

(57) ABSTRACT

A system for monitoring an acoustic scene outside a vehicle; the system including: a vehicle with wheels and a trunk, an acoustic sensor disposed in the trunk, a control unit operatively connected to the acoustic sensor, and at least one neural network operatively connected to the control unit, and trained in such a way to correlate the characteristics of an audio signal with types of road surfaces; the control unit is configured in such a way to receive an audio signal detected by the acoustic sensor while the vehicle is traveling, extract the characteristics of the audio signal and input said characteristics of the audio signal to the neural network in order to identify the type of road surface covered by the vehicle wheels.

4 Claims, 3 Drawing Sheets

(58) Field of Classification Search
CPC .......... G08G 1/048; G08G 1/01; G01H 17/00;
G10L 25/30; G10L 25/51
See application file for complete search history.

(56) References Cited

U.S. PATENT DOCUMENTS

2014/0169139 A1   6/2014  Lee
2020/0241552 A1*  7/2020  Leenayongwut ....... G10L 25/51

FOREIGN PATENT DOCUMENTS

EP        1562053 A2   8/2005
WO     2017012982 A1   1/2017

* cited by examiner

SYSTEM FOR MONITORING AN ACOUSTIC SCENE OUTSIDE A VEHICLE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a system for monitoring an acoustic scene outside a vehicle.

2. Description of Related Art Including Information Disclosed Under 37 CFR 1.97 and 37 CFR 1.98

Safety systems, driving assistance systems and autonomous driving systems are getting more and more popular in modern vehicles. These systems require the installation of sensors in the vehicles in order to monitor the space outside the vehicle in any weather condition.

Sensor solutions for the automotive industry are known to detect the conditions of the road surface (temperature, wetness), the presence of other vehicles or obstacles, etc.

Moreover, systems are known to extract useful information from environmental acoustic signals. These systems are based on Deep Learning algorithms that are capable of learning and recognizing events or situations based on audio signals. Such a research field is often defined as "machine listening".

Several research works are known, which show how to extract information on the acoustic scene in indoor spaces, such as for example:
- Sounds that indicate danger or anomalies (window breakage, shouts, explosions, falling people)
- Sounds that indicate anomalies (i.e. malfunctioning of an industrial installation)
- Sounds that indicate events (i.e. presence of wind, birds, human beings, etc.).

Moreover, public datasets are available for researchers in order to test new algorithms and improve the classification performance on these issues with respect to the prior art.

With reference to the automotive industry, the research activities have recently focused on the recognition of the type of road surface in terms of roughness and on the detection of a wet road surface.

Therefore, if acoustic sensors are installed in the vehicles, algorithms can be used to extract useful information from the acoustic signals detected by the sensors, such as the condition of the road surface (smooth/rough, dry/wet), the presence of anomalies in the engine, or the occurrence of events outside the vehicle.

Together with the electronic devices used to analyze the signals, acoustic sensors could be used to simultaneously monitor several aspects through only one sensor. Moreover, by combining the acoustic sensors with other sensors of known type, the strength of the detection system can be improved by means of redundancy.

For instance, the assisted or autonomous driving systems currently use radars and LIDAR (Light Detection and Ranging) to detect the obstacles on the road and the road markings (road sides and center lines). The combination of the two different types of sensors guarantees a higher resistance to variable climatic conditions because, for example, LIDAR tends to be unreliable in case of rain. Therefore, the addition of acoustic sensors is advantageous when other sensors are present and also to detect road features that are not covered by other types of sensors.

Moreover, the recognition systems of the acoustic scene can be used to improve the quality of the services provided in the passenger compartment, such as the infotainment systems and the hands-free communication systems, equalizing and improving the frequency response inside the passenger compartment However, the engineering of acoustic sensors, which are typically microphones, installed in a vehicle is impaired by several drawbacks. The optimal position of the microphone must be identified, at least with respect to some of the applications. This task is impaired by several difficulties because the interference that negatively affects a correct data acquisition must be considered. Furthermore, inexpensive and non-intrusive ways to install and connect the microphone must be identified.

A microphone that is installed outside the vehicle is exposed to wind, rain, and dust and in general to all weather agents. Moreover, the microphone must be positioned in such a way to be sufficiently distant from the exhaust system and from the engine in order to reduce their contribution on the acquired signal.

On the other hand, the interior of the passenger compartment of the vehicle involves additional problems, such as the presence of noise caused by human activities (voice, radio, etc.) and the acoustic insulation with respect to the exterior.

With reference to the recognition of the features of the road surface, all methods disclosed in the literature use microphones that are disposed in the proximity of the wheel, and, if the microphone is not an omnidirectional microphone, such a microphone is directed towards the wheel. In fact, the wheel stimulates an acoustic response from the road surface and, consequently, the proximity of the microphone with the contact surface between wheel and road surface may seem to be the best choice.

It has been demonstrated that the best choice between the four wheels is the back wheel that is the most distant wheel from the exhaust pipe. However, the positioning of the microphones in the proximity of the wheels involves the following problems:
- Presence of water in case of a wet road surface (the water is nebulized or sprayed on the microphone)
- Presence of dust and dirt
- Acoustic interference caused by wind and turbulence
- Noise of engine or exhaust system.

The problem of the presence of wind and turbulence can be solved using anti-wind sponges up to a given speed (lower than 100 km/h). The presence of water can be remedied with IP68 waterproof microphones. Nevertheless, the anti-wind sponges can be soaked with water in case of a wet road surface and in the presence of rain, degrading the quality of the signal in an unacceptable way.

FIG. 1 shows the degradation of the microphonic signal when the sponge and the acoustic sensor are wet. The signal is clearly attenuated and the frequency response of the microphone, which should be basically flat, is altered.

Another option is to position the microphone away from the rain or the road water. For example, in many vehicles, a microphone is installed at a certain height (away from sprays) in the lid of the trunk, in a place that is protected against the rain (i.e. in the license plate holder compartment).

As mentioned above, the microphones can be installed inside the passenger compartment.

It must be noted that several vehicles of the medium-high segment of the market are provided with microphones that are installed in the passenger compartment and connected with a voice command recognition system or a hands-free communication system. Therefore, these internal microphones could be also used for the recognition of the external acoustic scene, with a high money saving. Nevertheless, the internal microphones are impaired by the following problems:

Interference of human activities (radio, voice, etc.)
Acoustic insulation from the exterior.

US2014/0169139A1 discloses the use of a microphone disposed at the rear of the vehicle to open the trunk door, using a smart key system instead of manually opening the trunk door. The microphone is disposed outside the vehicle, in a position that is not defined, but is in any case comprised between the rear bumper and the rear axis of the vehicle. This application protects the microphone against any interference because the microphone is only used when the vehicle is stopped; therefore no interference is generated by the wind or the water from the road surface when the vehicle is moving. Moreover, the monitoring of the acoustic scene is used for the identification of a specific signal, and not for a large spectrum acquisition for analysis purposes.

CN103573098A discloses a self-induction type vehicle trunk opening device that uses a microphone disposed on the back lid to acquire the voice commands given by the user. In addition to the microphone, which is embedded in a unit defined as "voice acquisition unit", a radar and an automatic opening device of the trunk are provided. CN103573098A discloses a processing system of the acquired system that is used only when the vehicle is stopped. Therefore, the signal is not negatively affected by the interference caused by motion. Moreover, the monitoring of the acoustic scene is temporally limited to the acquisition of the voice command and is activated by the radar installed in the vehicle.

DE10234611A1 discloses the use of directional microphones for monitoring the environment around a motor vehicle in combination with other information detection systems in order to recognize the relative speed of at least one vehicle near the motor vehicle, in addition to alarms and horns, and for monitoring the blind spots. DE10234611A1 does not specify the mounting position of the directional microphones that, although not expressly indicated, are positioned in combination with the proximity sensor outside the vehicle in such a way to identify the distance and the type of detected obstacle. DE10234611A1 does not disclose any other possible applications and does not teach how to eliminate the signal interference.

EP1562053A2 discloses directional microphones for monitoring the blind spots.

DE102017200385A1 discloses an array of directional microphones for monitoring the direction of other sound sources.

None of the prior documents describes a positioning of the microphone inside the vehicle for monitoring the acoustic scene outside the vehicle.

BRIEF SUMMARY OF THE INVENTION

The purpose of the present invention is to eliminate the drawbacks of the prior art by disclosing a system for monitoring an acoustic scene outside the vehicle that is reliable, effective, efficacious and interference-free.

Another purpose of the present invention is to disclose such a system for monitoring an acoustic scene outside a vehicle that is versatile, inexpensive and easy to make and install.

These purposes are achieved according to the invention with the characteristics of the independent claim 1.

Advantageous embodiments of the invention appear from the dependent claims.

BRIEF DESCRIPTION OF THE SEVERAL VIEWS OF THE DRAWINGS

The system for monitoring an acoustic scene outside a vehicle according to the invention is defined in claim 1.

Additional features of the invention will be clear from the following detailed description, which refers to a merely illustrative, not limiting embodiment, as shown in the appended figures, wherein.

DETAILED DESCRIPTION OF THE INVENTION

Figure 1:
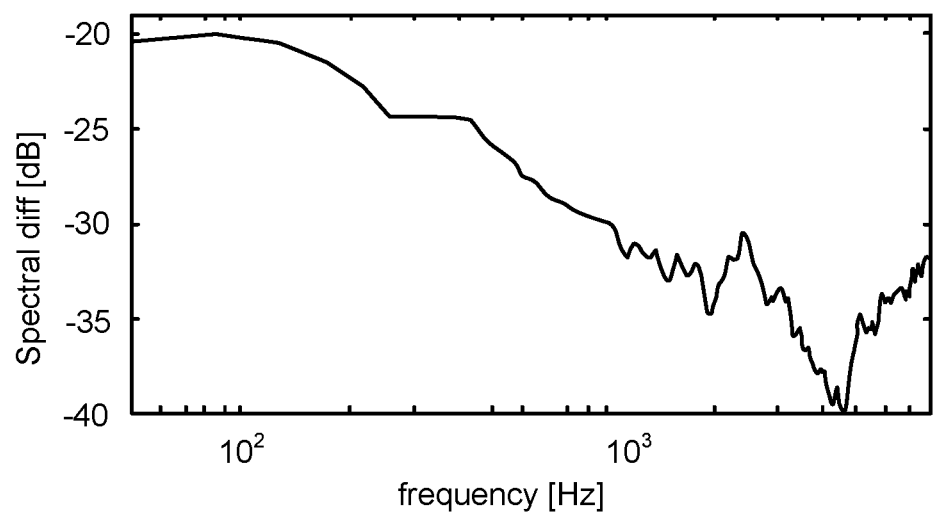
FIG. 1 is a chart that illustrates the difference between the spectrum of an audio signal acquired by an acoustic sensor provided with a dry anti-wind sponge and the one acquired by an acoustic sensor provided with a wet anti-wind sponge.

With reference to FIGS. 2 to 6, the acoustic sensor system for automotive application according to the invention is disclosed, which is generally indicated with reference numeral (100).

Figure 2:
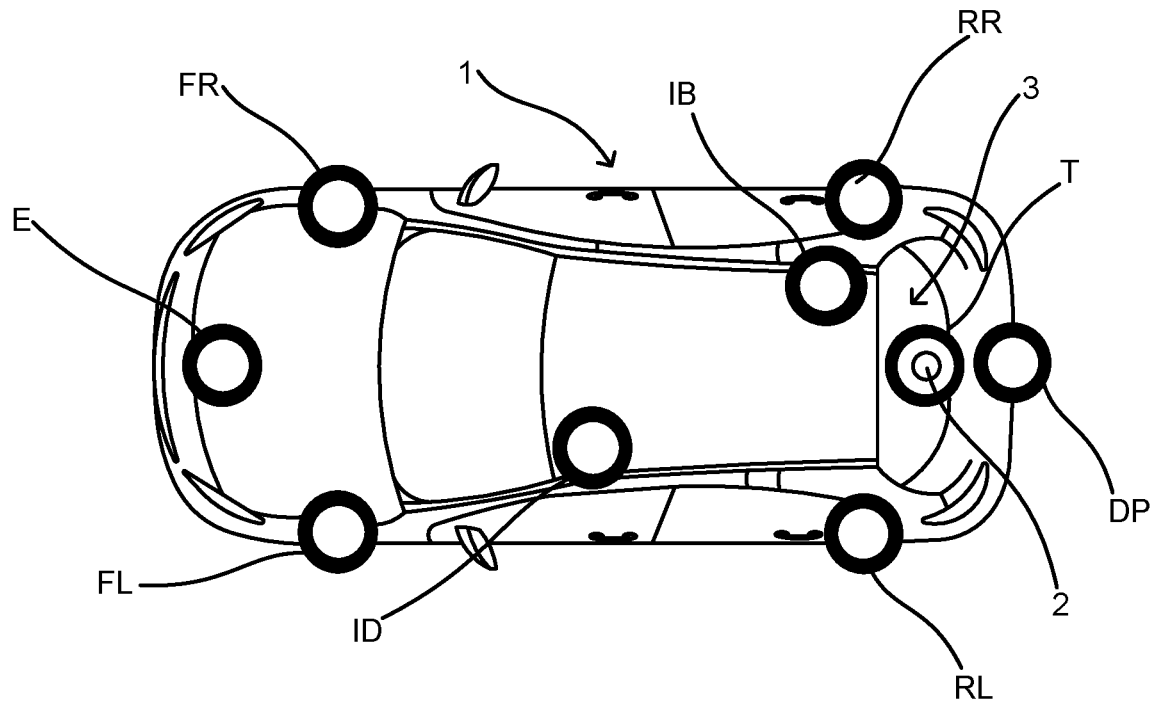
FIG. 2 is a diagrammatic top view of a vehicle wherein a plurality of mounting positions of the sensors is indicated.
Figure 3:
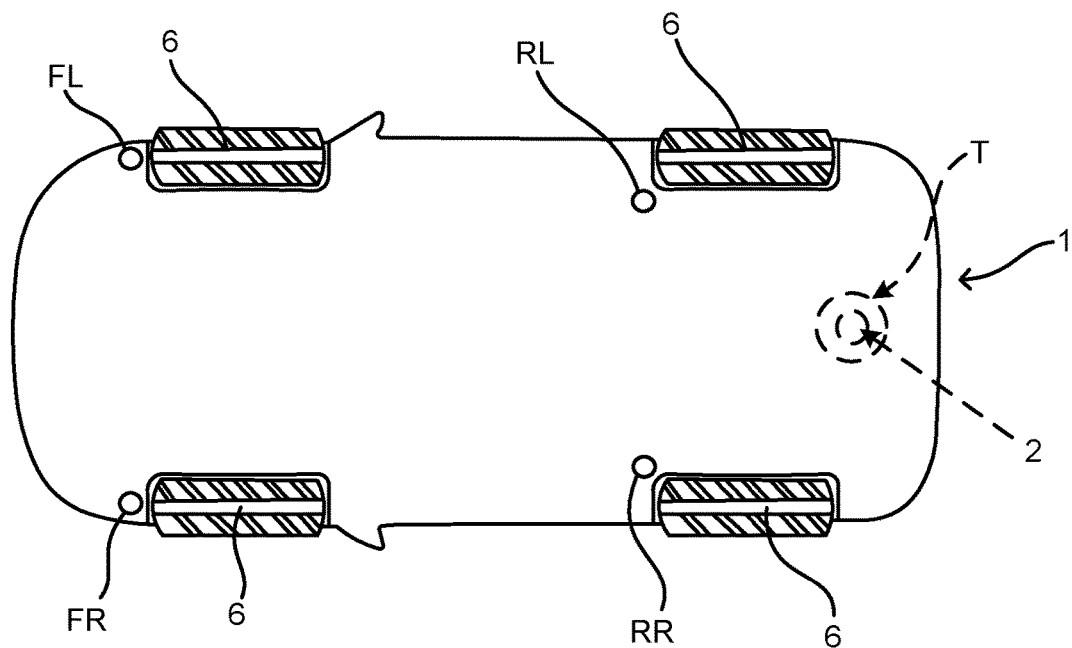
FIG. 3 is a diagrammatic bottom view of the vehicle of FIG. 2, which shows four positions in the proximity of the wheels of the vehicle and one position in the trunk with a broken line.

FIGS. 2 and 3 illustrate a vehicle (1). The vehicle (1) comprises wheels (6), a trunk (3) and a passenger compartment that is distinct and separate from the trunk (3).

A plurality of mounting positions for the acoustic sensors (microphones) is identified in the vehicle (1), in order to detect an acoustic scene outside the vehicle, such as for example the road surface condition (dry, wet, smooth, rough, etc.).

According to the prior art, the following eight mounting positions are generally used for the acoustic sensors:
- a position (E) in the engine compartment,
- a position (FL) in front of the left front wheel,
- a position (FR) in front of the right front wheel,
- a position (RL) in front of the left rear wheel,
- a position (RR) in front of the right rear wheel,
- a position (DP) in the license plate holder compartment,
- a position (ID) in the passenger compartment above the head of the driver, and
- a position (IB) in the passenger compartment above the passenger who is sitting in the back in the most distant position from the driver.

The present invention has examined the aforesaid eight positions and has demonstrated that they are not convenient; therefore, the present invention proposes a new mounting position for an acoustic sensor (2) in the trunk (3).

Figure 5:
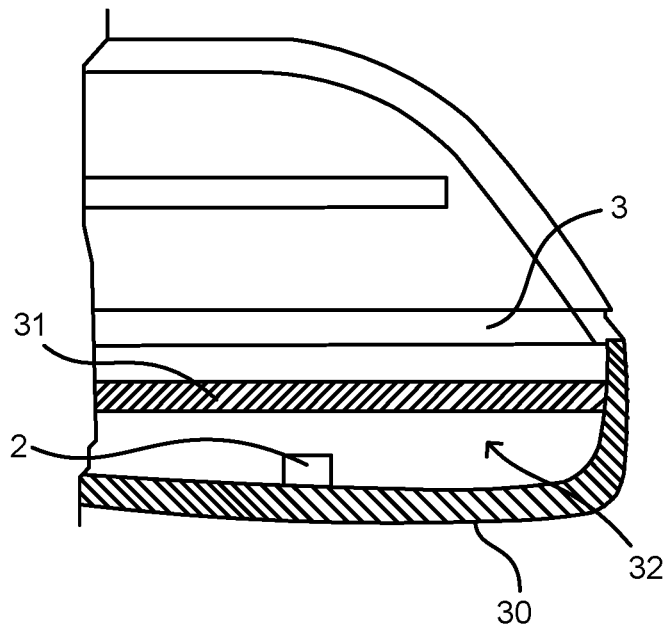
FIG. 5 is a partial sectional view of a trunk of the vehicle of FIG. 2.

With reference to FIG. 5, the trunk (3) generally comprises a bottom (30) made of metallic material that separates the trunk (3) from the exterior. A partition wall (31) is disposed in the trunk in such a way to define a lower compartment (32) between the bottom (30) and the partition wall (31). The lower compartment (32) is generally used to house a spare wheel or tools.

The system according to the invention provides for installing an acoustic sensor (2) in the position (T) inside the trunk (3), in particular in the lower compartment (32) used for housing the spare wheel that is situated under the partition wall (31) of the trunk. Preferably, the acoustic sensor (2) is positioned on the bottom (30) made of metallic material of the trunk.

The inventive solution makes the acoustic sensor (2) free from the interference caused by the weather agents because the acoustic sensor (2) is situated inside the vehicle. Therefore the acoustic sensor (2) does not need to be protected with anti-wind protections or waterproofing systems, with evident advantages both acoustically and economically.

Moreover, the acoustic sensor (2) is protected against the interference that is typical of the acoustic sensors disposed inside the passenger compartment (such as for example acoustic sensors disposed in the positions (ID) and (IB)) because the presence of the back seats of the vehicle, of the rear shelf and of the partition wall (31) of the trunk attenuates the sounds coming from the passenger compartment, acoustically separating the two spaces (passenger compartment and lower compartment (32) under the partition wall (31) of the trunk).

Figure 4:
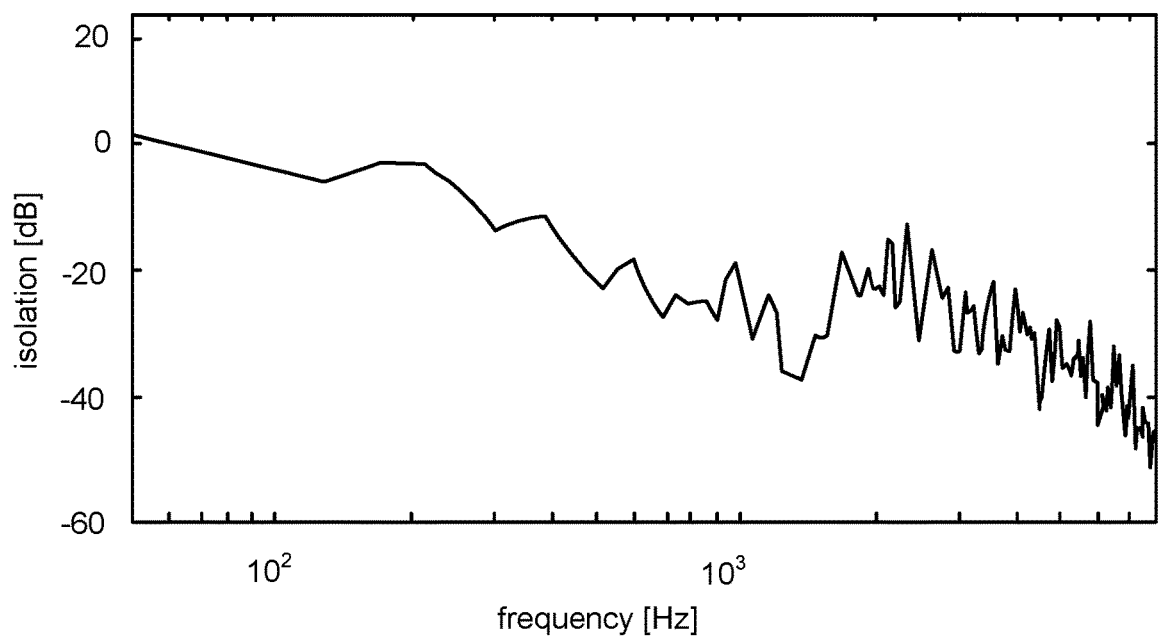
FIG. 4 is a chart that shows a signal attenuation as a function of the frequency, between the driving position and an acoustic sensor disposed in the trunk.

FIG. 4 illustrates a chart that shows the isolation (signal attenuation) measured between an acoustic sensor disposed in the position (ID) above the head of the driver and the acoustic sensor (2) disposed in the position (T) in the trunk. Such a chart refers to a Mercedes Class A vehicle. As shown in FIG. 4, the attenuation increases when the frequency increases. In particular, attenuation values higher than 20 dB are obtained for frequencies around 1 KHz.

Moreover, it must be noted that the issue of acoustic isolation from the exterior is considerably mitigated because the acoustic sensor (2) is disposed in adjacent position to the bottom wall (30) made of metallic material of the trunk, which is provided with a lower soundproofing than the body of the passenger compartment.

Additionally, the system according to the invention has some practical advantages. For example, in case of a minor accident or a bumper-to-bumper crash, the acoustic sensor (2) is protected against damage because it is not mounted inside the bumper of the vehicle.

Moreover, it is not necessary to modify the pre-existing spaces, which can maintain their external appearance, because the acoustic sensor (2) is concealed during the daily use of the vehicle.

As it is known, a vehicle is provided with rear lamps that are electrically powered. Therefore, the electrical connections of the rear lamps can be used for powering the acoustic sensor (2). Obviously, when designing the trunk, a specific housing should be provided for the acoustic sensor (2) in order to facilitate the electrical connections and the installation of the acoustic sensor.

The system according to the invention remedies the aforementioned practical issues and guarantees excellent results in the detection of the road surface because the acoustic sensor (2) is proximal to the road surface and the aforementioned interference is removed.

Figure 6:
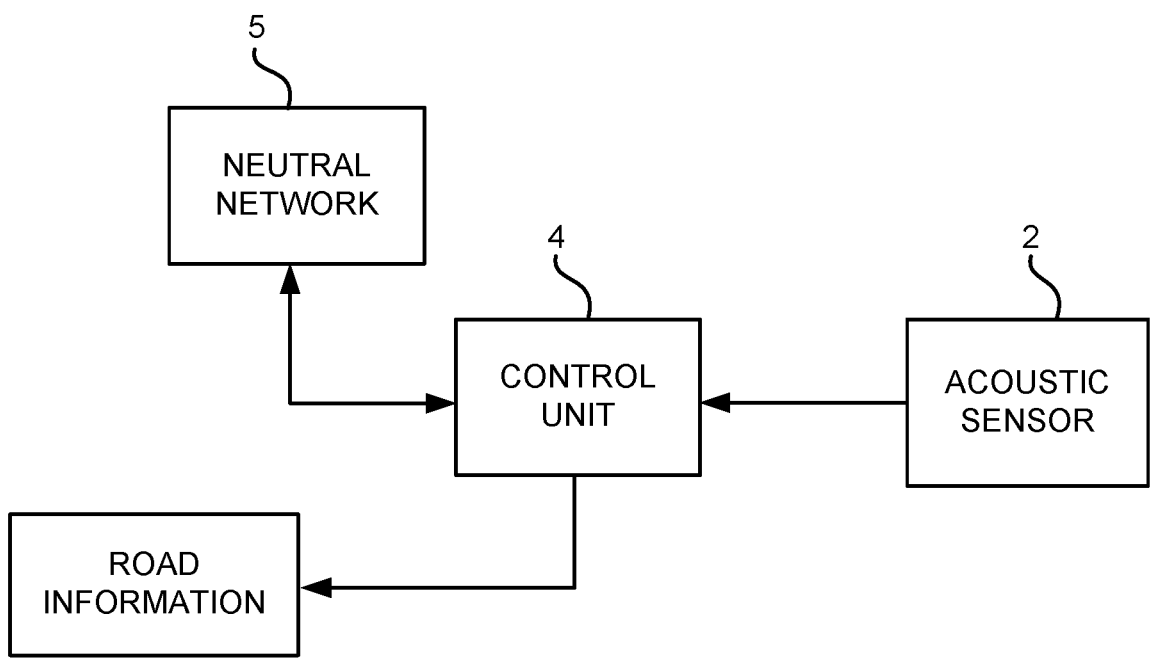
FIG. 6 is a block diagram that diagrammatically shows the operation of the system according to the invention.

With reference to FIG. 6, the acoustic sensor (2) is electrically connected to a control unit (4) of the vehicle. The control unit (4) is connected to a neural network (5) that is suitably trained and inputted with features obtained from the audio signal detected by the acoustic sensor (2). The neural network (5) has a configuration and a set of weights.

The term "configuration" indicates the combination of layers and the number and interconnection of the neurons of the neural network. The neuron is a structure that is provided with inputs and produces an output using a special activation function that varies according to the type of neuron. The weights are parameters that are used to "weigh" the amount in which a specific input of a neuron affects its output; otherwise said, the weights are used to manage the interconnections between neurons As such, the neural network can be considered as a parametric circuit, wherein the architecture and the quantity of parameters can be established in advance.

The optimal weights and the optimal configuration are obtained during a first step, which is defined as learning, and determine the understanding of the problem by the neural network.

After being optimally trained, the neural network (5) is inputted with data of the audio signal from the acoustic sensor (2). By processing the audio signal from the acoustic sensor (2), the neural network (5) returns information on the road surface to the control unit (4).

During a testing step of the neural network (i.e. when an algorithm of the neural network operates without any knowledge support from the exterior—the operating condition of interest), the audio signal is pre-processed by a DSP algorithm to extract the characteristic features of the signal in the time-frequency domain for each recording that is analyzed. These features are passed to the neural network that outputs the type of road surface (or the wet/dry condition) relative to the recording.

The neural network is a parametric circuit, wherein the parameters have been determined by means of the so-called training step, which uses a suitable learning algorithm that uses the knowledge of the features of the incoming audio signal and of the relative class that represents the type of road surface (information available after a manual labeling action on a certain number of recordings—training dataset). Obviously, the recordings of the training step and of the testing step are different.

For illustrative purposes, the neural network (5) can be a Bidirectional Long Short Term Memory (BLSTM). The features that are extracted from the audio signal detected by the acoustic sensor (2) can be Auditory Spectral Features (ASF), i.e. features obtained from Mel spectrograms of the audio signal.

Alternatively, an efficaciously trained Convolutional Neural Network (CNN) capable of distinguishing the type of road surface (smooth/rough) can be used.

Obviously, the neural network (5) provides for training on a large dataset that comprises types of different tires (summer tires (S) and winter tires (W)) and makes a comparison on the real generalization and transfer learning capacities of the system, comparing the potential on both types of tires.

The system performance is evaluated by using metrics of statistic type. Specifically, an F1-score metrics is used to measure the accuracy of a binary classification by means of a harmonic mean of precision and recall, i.e. using the knowledge of correct and incorrect predictions for each class. In such a case, being a binary classification, the classes can be considered as positive and negative, defining TP: correct positive prediction,
TN: correct negative prediction,
TP: incorrect positive prediction,
FN: incorrect negative prediction.

Therefore, the metrics can be formulated as follows:

$$F1\text{-score} = \frac{2 \cdot TP}{2 \cdot TP + FP + FN}$$

Following are the results obtained for the classification of dry/wet and smooth/rough road surface to show the performance that can be obtained according to the position of the acoustic sensors and to the type of tires (winter tires (W) or summer tires (S)).

TABLE 1

| Mic | TRAIN/TEST | F1-score |
|---|---|---|
| DP | W/W | 98% |
| DP | W/S | 1% |
| DP | S/W | 9% |
| DP | S/S | 92% |
| ID | W/W | 67% |
| ID | W/S | 74% |
| ID | S/W | 62% |
| ID | S/S | 96% |
| IB | W/W | 99% |
| IB | W/S | 94% |
| IB | S/W | 96% |
| IB | S/S | 98% |
| T | W/W | 96% |
| T | W/S | 95% |
| T | S/W | 97% |
| T | S/S | 99% |

Table 1 shows the results related with the recognition of the road surface in terms of dry/wet in four acoustic sensors disposed in the four best positions illustrated in FIG. 2. It has been demonstrated that the best positions are the positions (DP, IB, ID and T) in the recognition of the wet road surface using different datasets and CNNs. As shown in Table 1, in three cases out of four, the best result is obtained with the acoustic sensor disposed in the position (T) in the trunk.

TABLE 2

| Mic | TRAIN/TEST | F1-score |
|---|---|---|
| DP | S/S | 92.1% |
| DP | W/W | 85.6% |
| DP | S/W | 83.2% |
| DP | W/S | 82.9% |
| ID | S/S | 93.0% |
| ID | W/W | 89.3% |
| ID | S/W | 76.7% |
| ID | W/S | 87.5% |
| IB | S/S | 92.7% |
| IB | W/W | 90.8% |
| IB | S/W | 72.3% |
| IB | W/S | 84.4% |
| T | S/S | 93.2% |
| T | W/W | 91.8% |
| T | S/W | 88.7% |
| T | W/S | 88.7% |
| RR | S/S | 92.7% |
| RR | W/W | 87.5% |
| RR | S/W | 81.8% |
| RR | W/S | 80.3% |

Table 2 shows the results related with the recognition of the smooth/rough road surface using the same acoustic sensors used for Table 1, with the addition of one acoustic sensor disposed in the position (RR) in front of the right rear wheel, which can be used in this case because the signals to be classified are acquired with dry road surface. Also in this case, the tests are made using an algorithm that uses the CNNs. The results are referred to different types of datasets recorded using two different types of tires, i.e. summer tires (S) and winter tires (W).

The training of the neural networks is made on a type of tires, whereas the test (of which the F1-score is shown) can be made on the same type of tire or on the other type of tire. The purpose of such an assessment is to assess whether and how much the different type of tire affects the final result.

As shown in Table 2, in all four cases, the best result is obtained with the acoustic sensor disposed in the position (T) in the trunk.

The results of Table 1 and Table 2 show that the performance of both systems is acceptable and fully meets the generalization requirement; however, evidently, the performance is heavily affected by the position of the acoustic sensor and by the presence of the aforementioned interference. Evidently, the position of the acoustic sensor is a fundamental aspect in the examples given and, more generally, in all applications that use acoustic sensors for monitoring the acoustic scene outside the vehicle.

Finally, it must be noted that the solution of the present invention seems to be the best solution possible among the solutions that are studied in the majority of the cases and is considerably different from the other solutions. Therefore, the results are an important experimental confirmation of the aforementioned advantages.

Numerous equivalent variations and modifications, which are within the reach of an expert of the field and fall in any case within the scope of the invention as disclosed by the appended claims, can be made to the present embodiment of the invention.

The invention claimed is:

1. A system for monitoring an acoustic scene, the system comprising:
   a vehicle having a plurality of wheels and a trunk and a passenger compartment, the passenger compartment being separate and distinct from the trunk;
   an acoustic sensor disposed in the trunk, said acoustic sensor adapted to receive an audio signal;
   a control unit operatively connected to said acoustic sensor;
   at least one neural network operatively connected to said control unit, said at least one neural network adapted to correlate characteristics of the audio signal with a type of road surface, wherein said control unit is adapted to receive the audio signal detected by said acoustic sensor while said vehicle is traveling on the road surface and to extract the characteristics of the audio signal and to provide the characteristics to said at least one neural network so as to identify the type of road surface covered by the plurality of wheels of said vehicle, wherein the trunk has a bottom formed of metallic material that separates the trunk from an area exterior of said vehicle, the trunk having a partition wall therein, the partition wall defining a lower compartment, said acoustic sensor being disposed in the lower compartment.

2. The system of claim 1, wherein said acoustic sensor is disposed on the bottom of the trunk.

3. The system of claim 1, wherein said at least one neural network comprises a Convolutional Neural Network.

4. The system of claim 1, wherein the characteristics of the audio signal are Auditory Spectral Features obtained from Mel spectrograms of the audio signal.

* * * * *